United States Patent [19]

Merrill

[11] Patent Number: 5,377,760
[45] Date of Patent: Jan. 3, 1995

[54] FIBER REINFORCED GEL FOR USE IN SUBTERRANEAN TREATMENT PROCESSES

[75] Inventor: LaVaun S. Merrill, Englewood, Colo.

[73] Assignee: Marathon Oil Company, Findlay, Ohio

[21] Appl. No.: 94,913

[22] Filed: Jul. 21, 1993

Related U.S. Application Data

[63] Continuation-in-part of Ser. No. 856,007, Mar. 20, 1992, abandoned.

[51] Int. Cl.$^6$ .......................................... E21B 33/138
[52] U.S. Cl. ..................... 166/295; 166/294; 523/130
[58] Field of Search ............. 166/294, 295, 300; 175/72; 252/8.551, 315.3, 315.4; 523/130

[56] References Cited

U.S. PATENT DOCUMENTS

| | | | |
|---|---|---|---|
| 2,708,973 | 5/1955 | Twining. | |
| 2,811,488 | 10/1957 | Nestle et al. | 175/72 X |
| 3,079,332 | 2/1963 | Wyant | 252/8.551 X |
| 3,208,524 | 9/1965 | Horner et al. | 175/72 X |
| 3,374,834 | 3/1968 | Ramos et al. | |
| 3,462,958 | 8/1969 | Patin et al. | |
| 3,593,798 | 7/1971 | Darley | 166/295 |
| 3,701,384 | 10/1972 | Routson et al. | 166/292 |
| 3,949,811 | 4/1976 | Threlkeld et al. | 166/294 |
| 4,439,328 | 3/1984 | Moity | 252/8.551 |
| 4,683,949 | 8/1987 | Sydansk et al. | 166/270 |
| 4,957,166 | 9/1990 | Sydansk | 166/295 |
| 4,989,673 | 2/1991 | Sydansk | 166/294 X |
| 4,995,461 | 2/1991 | Sydansk | 166/294 X |

*Primary Examiner*—George A. Suchfield
*Attorney, Agent, or Firm*—J. L. Hummel; J. E. Ebel

[57] ABSTRACT

Fibers are added to a gelation solution and the mixture is pumped to a subterranean injection site where it gels in place. The gelation solution is preferably comprised of partially hydrolyzed polyacrylamide polymer and a crosslinking agent, while the fibers are those which do not interfere with the gelation process and can provide adequate reinforcement while not adversely affecting the ability of the solution to be pumped and injected. Glass fibers and cellulosic fibers are specifically disclosed as preferable reinforcing fibers.

13 Claims, No Drawings

FIBER REINFORCED GEL FOR USE IN SUBTERRANEAN TREATMENT PROCESSES

CROSS REFERENCE TO RELATED PATENT APPLICATIONS

This application is a continuation-in-part of copending U.S. patent application, Ser. No. 07/856,007, filed Mar. 20, 1992, now abandoned.

FIELD OF THE INVENTION

This invention relates to a gel of the type useful in improving the conformance of formations encountered in the drilling and production of hydrocarbons from subterranean wells. More particularly, it relates to gels which are capable of blocking or plugging relatively large openings in permeable formations.

BACKGROUND OF THE INVENTION

It is well known to treat subterranean formations in order to plug areas of high permeability. This leads to a better injection profile in connection with the use of injection wells and to overall improvement in flow profiles and sweep efficiencies. A number of methods of treating formations of high permeability have been employed or suggested, including the use of various cements and gels for sealing the open structure of the formation. A particularly useful gel system is described in U.S. Pat. No. 4,683,949, wherein a gel is prepared by forming a gelation solution above ground from a water-soluble acrylamide polymer and a cross-linking agent. The solution is then injected into the formation to be treated in at least partially gelled form to inhibit propagation into regions where no treatment is desired. This was an improvement over systems which required sequential injection of the gel components into a formation, a practice that often led to an inability to achieve complete mixing and gelation in the formation.

Even with the improved system referred to, difficulty is encountered in employing gel to plug large fissures because the larger masses of gels required often lack the necessary strength to resist the pressures to which they are exposed. In addition to the gel being required to seal relatively large fractures, for example, ⅛ inch or more in width, it must be possible to pump the gel or gelation solution for quite long distances, often in the range of 4000 to 5000 feet. It is suggested in the patent referred to that inert fillers such as fine rock particles or glass beads can be added to the gelation solution to reinforce the gel network structure. Such measures are not sufficient, however, to strengthen the gel structure to the extent necessary to bridge and remain in place in the openings encountered in highly permeable formations.

U.S. Pat. No. 3,701,384 discloses a method of sealing thief zones in a subterranean formation by plugging pores with a solid material. A slurry of finely divided inorganic solids is injected into the formation together with an aqueous colloidal dispersion of a water-insoluble metal hydroxide in a dilute aqueous solution of a high-molecular-weight organic polymeric polyelectrolyte. The preferred polymer solution contains between about 0.01 and about 0.2 percent by weight of high molecular weight polyacrylamide or hydrolyzed polyacrylamide. At these concentrations, the dissolved polymer causes the suspended solids to flocculate, thereby blocking pores in the formation. The tested inorganic solids which interacted with the polymer solution to form strong solids included finely ground asbestos fibers and magnesium oxide. However, asbestos is undesirable for use today, due to its carcinogenicity.

Another approach taken by the prior art is to pump a slurry containing a mixture of flexible fibers and a bonding agent into highly permeable portions of a formation interval. An agent which precipitates or gels the bonding agent is then injected into the interval. The goal of the method is to build up a filter cake of fibers on the permeable formation as a result of the fibers being deposited out of the slurry as the slurry flows through, the permeable formation, and then bond the fibers of the filter cake in place. Examples of such a method are disclosed in U.S. Pat. Nos. 3,593,798, 3,949,811 and 3,462,958.

Larger fissures are bridged according to the disclosure of U.S. Pat. No. 2,708,973 by setting fibrous plants in place in the fissure, after which cement is added, thereby building on the framework of the plants. While such a method can bridge larger gaps, the process is impractical for use in deep formations that extend over a large area.

U.S. Pat. No. 3,374,834 discloses a method of stabilizing earth formations by injecting an aqueous solution of gelling material which contains finely divided inert solids and needle-like crystals of silicate materials which act as a suspending agent to prevent premature settling out of the solids. The resulting gel does not, however, provide the desired combination of strength, economy, ease of mixing and ability to be readily introduced into a formation.

BRIEF SUMMARY OF THE INVENTION

It has been discovered that a gel formed around certain dispersed fibrous material results in stronger gels than were previously available. The invention also provides a convenient method of forming and injecting a reinforced gel.

In accordance with the invention, an opening in a subterranean formation is plugged by providing a gelation solution comprised of a water soluble crosslinkable polymer and a crosslinking agent, introducing reinforcing fibers into the gelation solution, injecting the fiber-containing solution into the opening to be plugged and crosslinking the gelation solution substantially to completion to form a fiber-reinforced crosslinked gel in the opening. The reinforcing fibers are of such a length and are present in such an amount that the solution can be readily pumped and injected into the formation of interest.

The specific quantity of fibers introduced to the gelation solution depends on the type of fibers and their dimensions. Preferably, the fibers are composed of a hydrophilic material. However, fibers composed of a hydrophobic material may be used if a suitable wetting agent is also incorporated into the gelation solution. The preferred fiber length is between about 100 and about 3200 microns. The preferred reinforcing fibers are glass fibers in the range of about 9% to about 60% by weight, and cellulosic fibers in a range of about 1% to about 8% by weight.

The gelation solution preferably comprises a partially hydrolyzed carboxylate-containing polymer and a chromic-carboxylate complex crosslinking agent, with the polymer preferably being a partially hydrolyzed polyacrylamide polymer and the crosslinking agent preferably being a chromic acetate complex.

The invention provides a gel of greater strength at little extra cost which is capable of being readily pumped and injected in the site of interest. Other aspects and benefits of the invention will readily be ascertained from the detailed description of the preferred embodiment of the invention which follows.

DETAILED DESCRIPTION OF THE PREFERRED EMBODIMENTS

As indicated above, the invention contemplates the incorporation of fibers in a gel by mixing the fibers with the gelation solution at the surface.

The gel compositions contemplated for use in the present invention must be capable of being pumped as a liquid and subsequently crosslinking in place to form a mature gel which is nonflowing and has sufficient strength to withstand the pressures exerted on it. Moreover, it must have a network structure capable of incorporating reinforcing fibers. Gels of particular interest are gels comprised of a carboxylate-containing polymer crosslinked with a crosslinking agent comprising a chromic carboxylate complex. The carboxylate-containing polymer may be any crosslinkable, high molecular weight, water soluble, synthetic polymer containing one or more carboxylate species. The average molecular weight of the carboxylate-containing polymer is in the range of about 10,000 to about 50,000,000, with the preferred range being about 100,000 to about 20,000,000.

Exemplary polymers include partially hydrolyzed polyacrylamide. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The partially hydrolyzed acrylamide polymer may be prepared according to any of the well known conventional methods in the art.

With respect to the chromic carboxylate complex crosslinking agent, the term "complex" means an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex useful as a crosslinking agent includes at least one or more electropositive chromium III species and one or more electronegative carboxylate species. Each complex optionally contains additional species which are not essential to the polymer crosslinking function of the complex, such as one or more water molecules or inorganic monovalent or divalent ions which function merely to balance the electrical charge of the complex.

Trivalent chromium and chromic ion are equivalent terms encompassed by the term "chromium III species" as used herein. The carboxylate species are advantageously derived from water soluble salts of carboxylic acids, especially low molecular weight mono-basic acids. Carboxylate species derived from salts of formic, acetic, propionic and lactic acid, lower substituted derivatives thereof and mixtures thereof are preferred. The carboxylate species include formate, acetate, propionate, lactate, lower substituted derivatives thereof and mixtures thereof, all of which are water soluble. The optional inorganic ions include sodium, sulfate, nitrate and chloride ions.

The complexes described and their method of preparation are well known in the art. The preferred chromic carboxylate complex for use in this invention is chromic acetate complex.

A preferred gel suitable for use in the invention is one of partially hydrolyzed polyacrylamide crosslinked with chromic triacetate. As is well known in the art, these gels can be readily formulated as a low viscosity fluid having a broad range of strengths and gel onset times.

The types and amounts of reinforcing fibers incorporated in the gel depend upon several factors. The fibrous material must readily permit the gel network to form around it, thereby producing a substantially stronger gel as a result. Fibers composed of hydrophilic materials, such as glass, cellulose, carbon, silicon, graphite, calcined petroleum coke, cotton fibers, and mixtures thereof can be used. If a wetting agent is included in the gelation solution, fibers composed of hydrophobic materials can also be used; suitable hydrophobic materials include nylon, rayon, hydrocarbon fibers, and mixtures thereof. Suitable wetting agents will be evident to one skilled in the art. The fibers must not interfere with the gelation process. Moreover, the concentrations of fiber and the length of the fiber should be such that the fiber-containing liquid gel can be pumped in the field without the need for special equipment. With respect to any particular fiber employed in the invention, it has been found that the longer the fiber, the more difficult it is to be mixed uniformly in solution. Fibers as long as 12,500 microns tend to aggregate and form clumps. The shorter the fiber, the easier it is to mix in solution. On the other hand, the shorter the fiber, the greater the quantity necessary to provide the desired level of strength in a reinforced mature gel. In general, fiber having a length in the range of 100 microns to 3200 microns, preferable 100 microns to 1000 microns is included in the solution in terms of weight ratio of fiber to gelation solution in the range of about 1% to about 60%, with the amount varying for the particular fiber involved.

Thinner fibers are preferred over thicker fibers since better results are obtained through use of a greater number of small diameter fibers than a lesser number of large diameter fibers. As to the polymer itself, the higher the concentration of polymer in the gelation solution, the stronger the gel is even without reinforcing fibers. Specific examples of fiber reinforced gels are given below.

EXAMPLE I

A polyacrylamide solution was prepared in the manner disclosed in the aforesaid U.S. Pat. No. 4,683,949. The polymer was a partially hydrolyzed polyacrylamide polymer of 3% concentration, having a molecular weight of 2,000,000, and the crosslinking agent was chromic triacetate. A portion of the solution was allowed to develop to a mature gel and other portions were mixed with cellulosic fibers and glass fibers, respectively, prior to gelling. The cellulosic fibers were comprised of carboxymethyl cellulose, which is a standard type of fiber used in oil field operations and which in this case had a length in the range of 100 microns to 400 microns and a thickness in the range of 5 microns to 50 microns, while the glass fibers were 1/32" commercial grade, having an average diameter in the order of 16 microns and a nominal length of about 1/32 inch. In connection with the cellulosic fibers, it will be understood that they are of ribbonlike shape, with the narrowest dimension being in the order of 5 microns and the widest dimension being in the order of 50 microns. In commercial practice the admixing of the polymer, crosslinking agent and fiber would be carried out by mixing the ingredients in bulk at the surface prior to injection into the formation to be treated or simultaneously mixing the ingredients near the wellhead by in-line mixing apparatus while injecting the mixed solution. For the purpose of demonstrating the effect of the fiber addition on the gel, the ingredients were well mixed by stirring in a container.

Various amounts of the cellulosic and glass fibers were added to the gel and, after the gel had matured, the strength of the reinforced gel was tested in terms of its yield stress. The yield stress was determined in the assembled cup and bob of a couette flow viscometer. When the gel was sufficiently mature the viscometer was started and the bob slowly rotated until yield was observed. This was compared against the yield stress of matured unreinforced gel, the results of which are shown in the following table.

TABLE 1

| Type Filler, wt. % | Ratio of Yield of Reinforced Gel to Yield of Unreinforced Gel |
| --- | --- |
| Cellulosic Fibers: | |
| 0 | 1 |
| 2 | 1.6 |
| 3.5 | 1.7 |
| 5 | 2.6 |
| Glass Fibers: | |
| 0 | 1 |
| 6 | 1.33 |
| 11 | 3.27 |
| 20 | >3.5 |
| 33 | >3.5 |
| 50 | >3.5 |

As can be seen, only very small amounts of cellulosic fibers significantly increased the yield strength of the mature gel. For example, only 2 wt. % of fiber resulted in an increase of 60% in yield strength, while 5% resulted in an increase of 160%.

Greater amounts of glass fibers were required to produce similar increases in yield strength. The addition of 6% glass fibers resulted in an increase of 33% yield strength over the unreinforced gel, while the presence of 11% glass fibers resulted in an increase of 227%. Readings of yield strength for amounts of fiber from 20 wt. % to 50 wt. % were not precisely obtained once it was determined that the yield strength had increased more than 250%, which was deemed to be more than sufficient for most applications of the reinforced gel.

In all cases the amounts of fiber added to the gel did not increase the viscosity of the gelation solution to a point where it could not be readily pumped and injected into a formation of interest.

EXAMPLE II

A polyacrylamide solution was prepared in the same manner as in Example I, except that in this case the polymer was a partially hydrolyzed polyacrylamide polymer of 5% concentration, having a molecular weight of 270,000. Again the crosslinking agent was chromic triacetate. A portion of the solution was allowed to develop to a mature gel and other portions were mixed with glass fibers prior to gelling. Some of the glass fibers in this case were similar to those added in Example I, the remainder of the glass fibers being 1/16″ commercial grade, having an average diameter in the order of 16 microns and a nominal length of about 1/16 inch.

As in the first example, various amounts of the glass fibers were added to the gel and, after the gel had matured, the strength of the reinforced gel was tested in terms of its yield stress, the results of which are shown in the following table.

TABLE 2

| Type Filler, wt. % | Ratio of Yield of Reinforced Gel to Yield of Unreinforced Gel |
| --- | --- |
| Glass Fibers (1/32 inch): | |
| 0 | 1 |
| 50 | 1.39 |
| 67 | 5.21 |
| 75 | >48.5 |
| Glass Fibers (1/16 inch): | |
| 0 | 1 |
| 20 | 10 (approximately) |

Although the polymer used to form this gel is considered to be a high molecular weight polymer, it has a substantially lower molecular weight than the polymer of Example I. This is consistent with the data which reveals that a greater amount of 1/32 inch fibers must be added to the gel of this example in order to produce increases in strength comparable to those produced in Example I by the same type of fibers. When 1/16 inch fibers were added to the same gel, however, levels of gel strength comparable to the strength provided by 1/32 inch fibers were attained with considerably less fiber. Thus the tests show that longer fibers produce greater strength. It will be understood that the use of longer fibers also results in increasing the viscosity of the gelation solution, and that a suitable compromise between gel strength and added viscosity of the gelation solution must be considered in determining the amount and type of fibers to add to the gelation solution. However, 12,500 microns fibers could not be mixed properly with the gelation solution.

EXAMPLE III

Further tests were conducted to compare the strength of gels reinforced with fiber to gels reinforced with particulate material. For this purpose an unreinforced polyacrylamide solution was made up as in Example II and allowed to develop to a mature gel. In addition, reinforcing material in the form of 40/60 reinforcing sand (capable of passing through a 40 mesh screen but not a 60 mesh screen) and glass fiber reinforcement measuring 1/32 inch in length was added to the solution. The resulting gels were tested in a yield strength cell. The yield stress test results were as follows:

| Filler, Type | Filler:PA Solution, Weight Ratio | Ratio of Yield of Reinforced Gel to Yield of Unreinforced Gel |
| --- | --- | --- |
| None | — | 1 |
| Fiber Glass | 1:1 | 1.39 |
| Fiber Glass | 2:1 | 5.21 |
| Fiber Glass | 3:1 | >48.5 |
| Sand | 4:1 | 2.61 |
| Sand | 5:1 | 2.84 |

The test results indicate that the gel containing a 2:1 weight ratio of fibers to solution was twice as strong as the gels containing a 4:1 and 5:1 weight ratio of sand to solution. With glass fibers in the weight ratio of 3:1 to solution the yield stress was so greatly enhanced that the equipment employed was not capable of continuing the test to failure. These results further confirm the increased strength produced by adding reinforcing fibers to the gelation solution prior to injection.

EXAMPLE IV

Three percent by weight of cellulose fibers was mixed with a solution containing 4% polyacrylamide and a crosslinking agent polyacrylamide at the site of a well thought to have a large casing leak. Mixing the fibers with the gelation solution and injecting the resulting mixture, using standard oil field equipment, proceeded without problems.

As stated above, thinner fibers are preferred over thicker fibers since better results are obtained using a greater number of small diameter fibers than a lesser number of large diameter fibers. Although the thickness of the fibers may vary according to the particular fibers involved, it is preferred that glass fibers have a diameter in the range of 0.5 micron to 30 microns and that cellulosic fibers have a thickness in the range of 0.5 micron to 50 microns.

Although cellulosic and glass fibers have been found to readily adhere to the network structure of partially hydrolyzed polyacrylamide gelation solutions in amounts that allow the fiber-containing gelation solution to be pumped in the field without requiring specialized equipment, it is possible that other fibers may also perform adequately within the parameters of the invention. The invention does not, however, include fibers which may interfere with the gelation process. In this connection it was found that the presence of steel or iron fibers will interfere with the crosslinking of the gel and should not be employed.

The reinforced gel resulting from the process of the invention is considerably stronger than unreinforced gel and is capable of plugging relatively large openings in subterranean formations. It can be used, for example, to seal large cracks behind cement work and as a remedial treatment requiring increased structural strength over that of conventional gels. The reinforcing fibers are simple to introduce into the gelation solution and the solution is readily capable of being pumped and injected into the location of interest. The reinforced gel is economical, basically adding only the cost of the reinforcing fiber to the cost of known processes.

It should be understood that the invention is not necessarily limited to the specific details described in connection with the preferred embodiment, and that changes to certain features and aspects thereof which do not affect the overall basic function and concept of the invention may be made by those skilled in the art without departing from the spirit and scope of the invention, as defined in the appended claims.

What is claimed is:

1. A process for plugging an opening in a subterranean formation, comprising the steps of:
    providing a gelation solution comprised of a water soluble crosslinkable polymer and a crosslinking agent;
    introducing reinforcing fibers, said fibers having a length in the range of about 100 microns to about 3200 microns, into the gelation solution in an amount such that the weight ratio of the fibers to the solution is about 1% to about 60% and the solution can be readily pumped into the subterranean formation;
    injecting the fiber-containing solution into the formation and into the opening to be plugged, the opening having a width of at least ⅛ inch; and
    crosslinking the gelation solution substantially to completion to form a fiber-reinforced crosslinked gel in the opening.

2. The process of claim 1, wherein the polymer is a partially hydrolyzed acrylamide polymer having a molecular weight in the range of about 10,000 to about 50,000,000.

3. The process of claim 1, wherein the polymer is a partially hydrolyzed acrylamide polymer having a molecular weight in the range of about 100,000 to about 20,000,000.

4. The process of claim 1, wherein the gelation solution comprises a partially hydrolyzed carboxylate-containing polymer and a chromic-carboxylate complex crosslinking agent.

5. The process of claim 1, wherein the polymer is a partially hydrolyzed acrylamide polymer.

6. The process of claim 5, wherein the crosslinking agent is a chromic acetate complex.

7. The process of claim 1, wherein said reinforcing fibers are hydrophilic.

8. The process of claim 7, wherein the hydrophilic fibers are glass fibers having a length in the range of about 1/32 inch to about ⅛ inch, the weight ratio of the glass fibers to the gelation solution being in the range of about 9% to about 60%.

9. The process of claim 7, wherein the hydrophilic fibers are glass fibers having a diameter in the range of about 0.5 micron to about 30 microns.

10. The process of claim 7, wherein the hydrophilic fibers are cellulosic fibers having a length in the range of about 100 microns to about 1000 microns, the weight ratio of the cellulosic fibers to the gelation solution being in the range of about 1% to about 8%.

11. The process of claim 7, wherein the hydrophilic fibers are cellulosic fibers having a thickness in the range of about 0.5 to about 50 microns.

12. The process of claim 1, wherein said reinforcing fibers are hydrophobic and said gelation solution further comprises a wetting agent.

13. The process of claim 12, wherein said hydrophobic fibers are nylon, rayon, hydrocarbon fibers, or mixtures thereof.

* * * * *